US008836151B2

(12) United States Patent
Vogel et al.

(10) Patent No.: US 8,836,151 B2
(45) Date of Patent: Sep. 16, 2014

(54) STARTER GENERATOR ARRANGED WITHIN THE FLYWHEEL HOUSING IN AN INTERNAL COMBUSTION ENGINE

(71) Applicant: MAN Truck & Bus AG, Munich (DE)

(72) Inventors: Werner Vogel, Burgoberbach (DE); Markus Lampalzer, Feucht (DE); Josef Geissler, Augsburg (DE); Bernd Schreiner, Munich (DE); Michael Patla, Fuerth (DE)

(73) Assignee: Man Truck & Bus AG, Munich (DE)

( * ) Notice: Subject to any disclaimer, the term of this patent is extended or adjusted under 35 U.S.C. 154(b) by 85 days.

(21) Appl. No.: 13/773,892

(22) Filed: Feb. 22, 2013

(65) Prior Publication Data
US 2013/0213182 A1 Aug. 22, 2013

(30) Foreign Application Priority Data

Feb. 22, 2012 (DE) .......................... 10 2012 003 386

(51) Int. Cl.
| B60L 11/02 | (2006.01) |
| F16F 15/30 | (2006.01) |
| F02N 15/00 | (2006.01) |
| F02N 11/00 | (2006.01) |
| B23P 19/04 | (2006.01) |
| F02N 11/04 | (2006.01) |

(52) U.S. Cl.
CPC ............... *F02N 11/00* (2013.01); *F16F 15/30* (2013.01); *F02N 15/006* (2013.01); *B23P 19/042* (2013.01); *F02N 11/04* (2013.01)

USPC ........................................................ 290/27

(58) Field of Classification Search
USPC .................. 290/22, 27, 28; 310/118; 903/902
IPC .................................. B60K 6/26,6/40, 2006/20
See application file for complete search history.

(56) References Cited

U.S. PATENT DOCUMENTS

| 6,729,423 | B2 * | 5/2004 | Kobayashi et al. ........ 180/65.21 |
| 2004/0232702 | A1 * | 11/2004 | He .................................. 290/31 |
| 2009/0302720 | A1 * | 12/2009 | Chiba ......................... 310/75 R |
| 2013/0213183 | A1 * | 8/2013 | Vogel et al. ..................... 74/7 C |

FOREIGN PATENT DOCUMENTS

DE 195 31 846 C1 4/1997

* cited by examiner

*Primary Examiner* — Vanessa Girardi
(74) *Attorney, Agent, or Firm* — Lucas & Mercanti, LLP

(57) ABSTRACT

An arrangement connectable to an internal combustion engine having a crankshaft, the arrangement including a flywheel, which is connectable to the crankshaft and coupled by a coupling device to output elements. An intermediate piece is arranged in a torque-transmitting manner between the flywheel and the coupling device. A starter generator is arranged within a flywheel housing and operatively connected to the crankshaft. The intermediate piece has in the center thereof an opening in which a shaft body is mounted in an axially movable manner, and the shaft body is connected to the coupling device by means of a flexible transmission element.

19 Claims, 2 Drawing Sheets

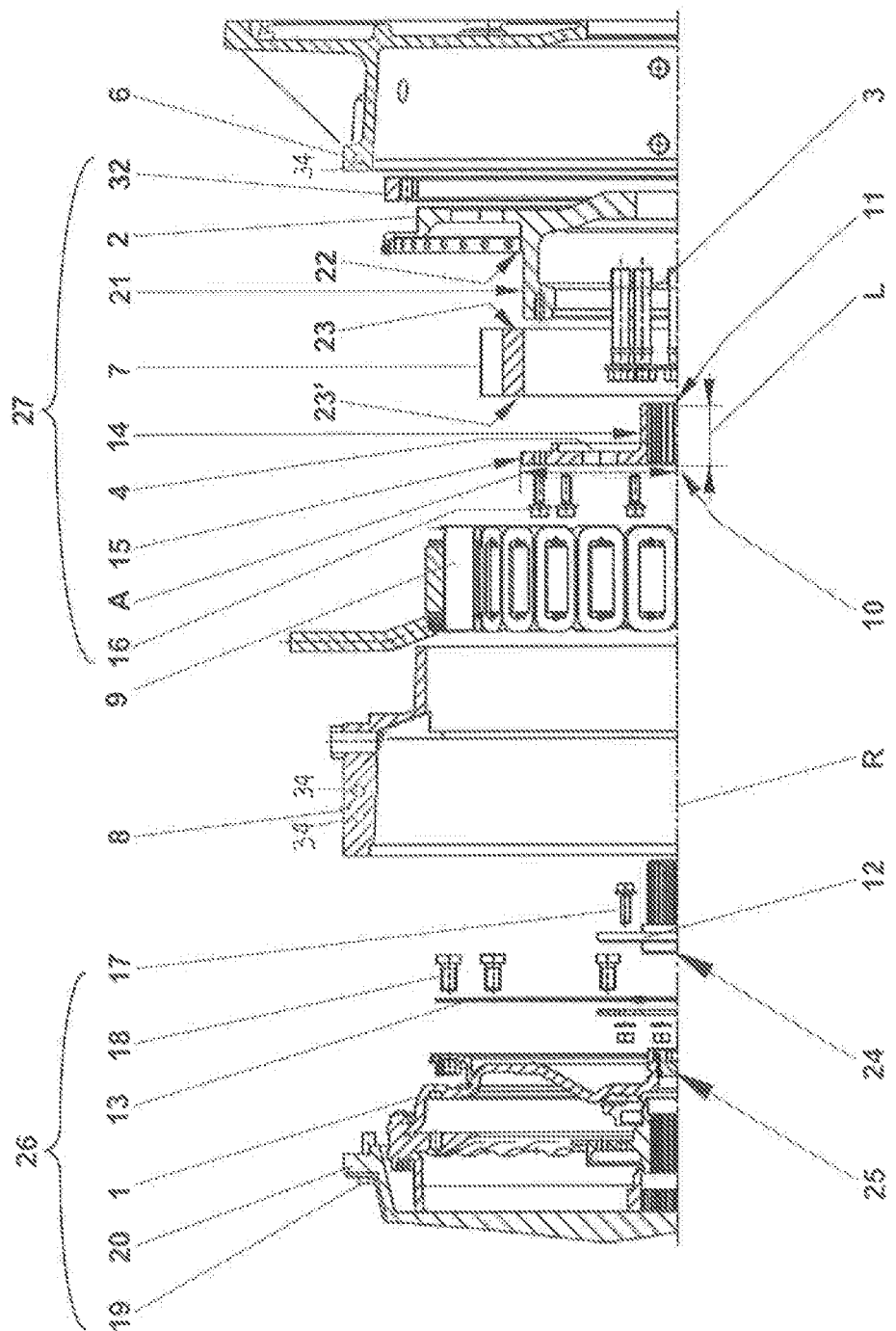

STARTER GENERATOR ARRANGED WITHIN THE FLYWHEEL HOUSING IN AN INTERNAL COMBUSTION ENGINE

CROSS-REFERENCE TO RELATED APPLICATIONS

This application claims the priority of DE 10 2012 003 386.9 filed Feb. 22, 2012, which is incorporated by reference herein.

BACKGROUND OF THE INVENTION

1. Field of the Invention

The invention relates to an arrangement for an internal combustion engine having a crankshaft. A flywheel, which is connectable to the crankshaft and is coupled by means of a coupling device to output elements, wherein an intermediate piece is arranged in a torque-transmitting manner between the flywheel and the coupling device, and a starter generator is arranged within a flywheel housing and operatively connected to the crankshaft.

2. Description of the Prior Art

A connection of this kind is disclosed by DE 195 31 846 C1, this being a flexible shaft coupling on which a flexible transmission means is arranged between the flywheel and a generator shaft.

SUMMARY OF THE INVENTION

An object of the present invention is to connect an internal combustion engine fitted with a starter generator, preferably with a starter generator connected directly to the crankshaft, in such a way that the components of the drive train are easy to assemble and economical to manufacture and that subsequent removal of the individual parts in a problem-free manner is made possible. It is furthermore an object of the invention to arrange the starter generator and the additional connecting elements of the drive train within as small as possible an installation space in the region between the engine and the coupling device and in such a way that low-cost manufacture of the individual parts and easy assembly is made possible.

According to an embodiment of the present invention an intermediate piece has in the centre thereof an opening in which a shaft body is mounted in an axially movable manner, and the shaft body is connected to a coupling device by a flexible transmission element. It is by virtue of the fact that the flexible transmission element arranged on the coupling device side has a shaft body facing towards the engine as a power-transmitting joining member and that said shaft body is mounted in a linearly movable manner in the opening in the centre of the intermediate piece that assembly and/or joining together of a first subassembly, comprising the coupling device, the flexible transmission means and the shaft body, and a second subassembly, comprising the intermediate piece and a flywheel, is at all possible or at least is possible in a simple and economical manner. This component capable of linear motion in the drive train likewise makes it possible for axial movement of the flexible transmission element to be compensated and, at the same time, for reliable torque transmission from the crankshaft, via the flywheel, to the intermediate piece thereof and, from the latter, via the twist-proof attachment, to the shaft body and, from the shaft body, to the flexible transmission element and finally, from the latter, to the coupling device to be achieved.

In this context, (crankshaft) starter generators are understood to mean electric machines and hence energy converters which can convert between electric energy and mechanical energy. The starter generator thus performs the function both of a starter or electric motor and that of a generator. The generator function can thus serve as a replacement for an alternator which introduces energy into the vehicle battery.

It is furthermore advantageous not to mount the shaft body directly on the flywheel since the indirect attachment of the shaft body via the intermediate piece makes possible an adaptable solution for connecting elements of a different type between the flywheel and the coupling device. By stocking one flywheel, it is thus easily possible to connect the flywheel to different coupling devices through an appropriate choice of different intermediate pieces or adapter elements. The subject matter of the invention in the present case concerns the attachment of a flywheel to a coupling device via a flexible transmission element, which is preferably of disc-type design and is, in particular, designed as a "flex plate".

The intermediate piece is preferably connected directly or indirectly to the flywheel. Direct attachment can comprise a contact region between the intermediate piece and the flywheel. Indirect attachment can be achieved by connecting the intermediate piece to an intermediate component (e.g. the rotor of the starter generator) and connecting the latter, in turn, to the flywheel, these three components being connected to one another in a manner secure against twisting by appropriate measures (positive engagement and/or nonpositive engagement).

In a preferred embodiment, the intermediate piece is of disc-type design and, in the region of the opening, comprises a collar region. This collar region is preferably aligned towards the crankshaft in the fully assembled state of the intermediate piece. It is particularly preferable if the collar length has a ratio of at least 1:1.0 to 1:5.0, particularly preferably 1:1.5 to 1:3.0, to the spacing of the axis of rotation from the outer edge of the intermediate piece. The collar-type configuration of the opening is a simple way of achieving an enlarged contact area between the intermediate piece and the shaft body. The larger contact area provides two advantages, namely, on the one hand, that a larger movement of the shaft body in the axial direction is thereby made possible and, on the other hand, that contact between the two elements is maintained during this process. Another advantage may be seen in the fact that the enlargement of the area in which the two elements touch or are in contact reduces the effective torque per area in which they touch or are in contact and hence makes it possible to reduce the loads on the two components due to the at least temporarily relatively high torques. By virtue of the fact that the collar region extends towards the crankshaft, no additional installation space in the axial direction is taken up.

In another advantageous embodiment, the shaft body is connected positively to the opening of the intermediate piece in such a way that a torque can be transmitted from the intermediate piece, via the shaft body, to a flexible transmission means fastened to the shaft body. This ensures that, despite axial movement of the shaft body due to movements of the flexible transmission means, torque transmission by the intermediate piece to the shaft body can be guaranteed at all times.

For greater ease of disassembly, it is advantageous if the intermediate piece is fastened detachably to the flywheel and/or the shaft body is fastened detachably to the flexible transmission means and/or the flexible transmission means is fastened detachably to the coupling device by means of fastening means. It is particularly advantageous here if the fastening means—e.g. screws—are aligned in such a way in the assembly/joining direction thereof that the fastening means via which the intermediate piece is mounted on the flywheel is aligned in the opposite joining direction and/or, with an engagement region for the application of a tool for assembly aligned in the opposite direction to the fastening element by means of which the shaft element is mounted on the flexible transmission element and/or to the fastening element by means of which the flexible transmission element is mounted on the coupling device. This results in different, preferably in opposite, joining and/or assembly directions for the first and second subassembly and/or different, preferably opposite, alignments of the tool engagement regions of the respective fastening elements. This enables the two subassemblies to be joined together and preassembled in a simple and economical manner, allowing for the subsequent fitting of the shaft body into the opening of the intermediate piece. Moreover, this also enables the required installation space in the axial direction to be reduced or kept small.

It is furthermore proposed that the starter generator comprises a stator and a rotor, wherein the stator is fastened at least in some regions to a housing of a flywheel housing and/or at least in some regions to a housing which fits over the coupling device. In particular, it is advantageous here if the rotor is fastened at least in some regions to the flywheel and/or at least in some regions to the intermediate piece. This enables the rotor itself to be fastened either to the flywheel and/or to the intermediate piece. It is also possible to provide a certain proportion of the support for the rotor on the flywheel and a further proportion on the intermediate piece.

In order to restrict and/or prevent axial mobility of the rotor in an economical manner, it has proven advantageous if the adjacent regions of the flywheel and of the intermediate piece make positive contact with, e.g. "engage around", the rotor. By virtue of the fact that the rotor is arranged in the region of the attachment of the intermediate piece and the flywheel, it is thus furthermore possible, in addition to the torque-transmitting function of the intermediate piece and the axial displacement of the shaft body within the opening of the intermediate piece made possible by the intermediate piece, to achieve the function of the intermediate piece exerting a conjoint influence on the axial mobility of the rotor and/or inhibiting said mobility.

More specifically, this can mean that, in the fully assembled state, the rotor enters into a positive and/or non-positive connection with the flywheel and/or with the intermediate piece at least at its ends, ensuring that the rotor is secured against twisting, the rotor preferably having a disc-, prism- and/or cylinder-type shape. This makes it possible, for example, for the disc-type rotor, which has an opening in the centre thereof, to be placed on the intermediate piece and/or on a corresponding protrusion of the flywheel and to undergo positive and/or nonpositive fixing at its ends by assembly of the flywheel and the intermediate piece.

According to another embodiment of the invention, it is envisaged that, at the end of the shaft body remote from the crankshaft in the fully assembled state, the shaft body comprises a bearing region for accommodating and/or supporting an output shaft and/or shaft regions of the coupling device, wherein the output shaft and/or shaft regions of the coupling device is/are preferably rotatably mounted in the bearing region of the shaft body and is/are therefore supported against radial movements or forces. By virtue of the fact that the shaft body comprises an accommodation region of this kind, the shaft body can perform not only its torque-transmitting function but also a stabilizing and guiding function for the coupling device. It is advantageous here if the element to be accommodated extends within the aperture of the flexible transmission means, with material of the shaft element being arranged between said element to be accommodated and the flexible transmission means.

The flexible transmission means, which is preferably of disc-, prism- and/or cylinder-type design, has fastening means for connection to the shaft body in a radially inner region of the transmission means, and has fastening elements for connection to a coupling device element on the radially outer region of the transmission means, wherein, in the fully assembled state, the radially outer fastening elements are preferably at a spacing from the axis of rotation of the drive train which corresponds to 0.6 to 1.6 times the spacing of the centre line of the starter generator from the axis of rotation of the drive train, and preferably 0.85 to 1.35 times said spacing. Given the design of the connecting elements, of the fixing of the flexible transmission means and of the coupling device, there may be conflicts in these spacing regions, in particular, with a starter generator subassembly that is likewise arranged in this spacing region. It is therefore advantageous, particularly in this case, if the connection between the flywheel and the coupling device is accomplished by means of the above-described assembly option for the shaft body and the intermediate piece.

The stator and the rotor together with the components and attachments thereof, e.g. the cables for the power and/or control electronics, control units, windings and the like, should be taken as the starter generator subassembly.

It has furthermore proven expedient that the intermediate piece is provided with at least one feed-through opening, wherein the feed-through opening is arranged and designed in such a way that, in the assembled state of the flywheel and the intermediate piece, at least one fixing element for fastening the flywheel to the crankshaft can be released and/or fixed by feeding a tool and/or by feeding the fixing element itself through the feed-through opening. For this purpose, the centre line of the feed-through opening can preferably be aligned coaxially and/or axially parallel and with a maximum axis offset of 3 cm with respect to the centre line of the feed-through opening of the flywheel and/or to a centre line of a fixing receptacle on the crankshaft.

The subject matter according to the invention is advantageous particularly in drive trains in which a toothed rim is arranged on an outer circumference of the flywheel, wherein the toothed rim is preferably connected to a further electric motor/generator, preferably a starter of purely electrical construction, by means of at least one gearwheel. This type of drive train provides a further electric motor/generator in addition to the first electric motor/generator (in this case the starter generator), with the further electric motor/generator serving as a starter for a cold engine and the electric motor/generator described first, i.e. the starter generator, being used predominantly or exclusively for starting operations which are performed on an engine which is already warm and hence easier to put into operation, for example. Since the electric motor/generator (in this case starter generator) arranged directly on the flywheel has only to supply low torques for starting the engine, it can be of correspondingly small dimensions and hence, in turn, can have a positive effect on the volume requirement of the engine, particularly in the region of the flywheel and/or of the coupling device, with a corresponding trend towards a smaller volume.

It has furthermore proven advantageous if a cooling device is provided in the region of the starter generator, in particular in the region of the supporting region of the stator (e.g. at a maximum spacing of 5 cm). This cooling device can comprise a liquid cooling system, preferably a water cooling system, which is operatively connected to the cooling circuit of an engine connected to the flywheel housing, wherein cooling ducts of the cooling device are passed through openings in the flywheel housing and/or are integrated at least in some regions into recesses and/or cavities of the flywheel housing. For this purpose, the flywheel housing can be provided on the outside with connection points for the feed and discharge, and the cooling medium can be passed between the feed and discharge in (multi- or single-part) cooling ducts built integrally into the flywheel housing. In this case, the cooling duct can be integrated integrally into the flywheel housing, at least in some regions, and/or can be formed at least in some regions by an accommodation region of the flywheel housing and a covering element placed in a sealing manner on said accommodation region. By means of the cooling device, heat generated by the starter generator can be dissipated in order in this way to increase the output in generator mode. In the case where at least part of the cooling duct is embodied as a separate component (e.g. a covering element), it is advantageous if said separate component is fed through the same opening as the cabling of the starter generator, with the cabling and the separate component of the cooling duct being installed as a subassembly on the flywheel housing, for example. By virtue of the spatial proximity of the cooling duct and the cabling, cooling and/or heating of the cabling of the starter generator can be achieved, even outside the more restricted area around the starter generator. As an alternative or in addition to the described arrangement of the cooling device and of the cooling duct thereof in the region of the flywheel housing, it is possible to arrange the cooling device and the cooling ducts thereof in or on the housing means, at least in some regions. In this context, the housing means is a housing that adjoins that side of the flywheel housing which faces away from the engine and that surrounds at least parts of the drive train (clutch, intermediate piece, shaft body and/or the flywheel). By virtue of the spatial arrangement (proximity) and/or by virtue of the integral material connection between the cooling ducts of the cooling device and the attachment of the starter generator (or the bearing location thereof), the cooling device described is particularly suitable for dissipating waste heat from the starter generator.

BRIEF DESCRIPTION OF THE DRAWINGS

The invention is explained in greater detail with reference to illustrative embodiments in the figures of the drawing, in which

FIG. 2 shows a schematic exploded sectional view of the upper half of the drive train shown in FIG. 1 in full section.

DETAILED DESCRIPTION OF THE PRESENT INVENTION

Figure 1:
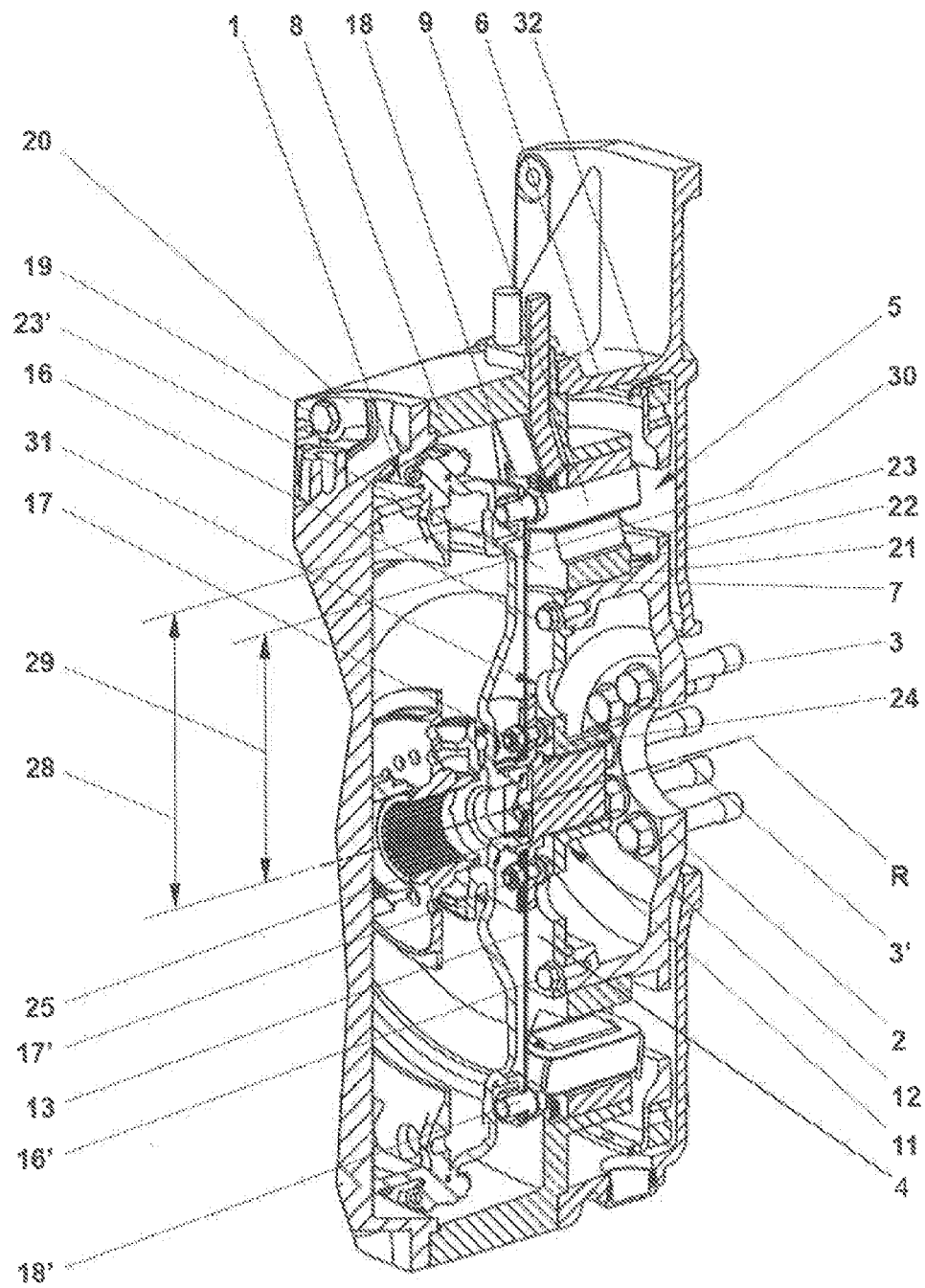
FIG. 1 shows a perspective full sectional view of a drive train design according to the invention.

In the figures of the drawing, part of the drive train and hence an arrangement for connecting an internal combustion engine together with the crankshaft (not shown) thereof to a coupling device 1 are illustrated. Here, the coupling device 1 is positioned on the left-hand side of the drawing, and the internal combustion engine with the crankshaft (not shown) thereof is positioned on the right-hand side of the drawing. On one side, a flywheel 2 is coupled directly to the crankshaft by means of fastening means 3, 3', and is coupled by means of the coupling device 1 to output elements, e.g. an output shaft (not shown), wherein an intermediate piece 4 is incorporated in a torque-transmitting manner between the flywheel 2 and the coupling device 1. A starter generator 5 is arranged within a flywheel housing 6. The starter generator 5 has a rotor 7 fastened to the flywheel 2 and a stator 9 fastened indirectly to the flywheel housing 6 by means of a housing means 8.

The intermediate piece 4 is of substantially disc-type design and, in the centre 10 thereof, has an opening 11, in which a shaft body 12 is mounted in an axially movable manner. The shaft body 12 is connected to the coupling device 1 by means of a flexible transmission element 13, which can also be referred to as a "flex plate" in the case illustrated. In the region of the opening 11, the intermediate piece 4 has a collar region 14, which, in the case illustrated, extends towards the flywheel 2 and the crankshaft in the fully assembled state. The collar region 14 surrounds the opening 11 in the manner of a cylinder. The collar length L (cf FIG. 2) has a ratio of 0.2:1 to 1:1 to the spacing A of the axis of rotation R from the outer edge 15 of the intermediate piece 4. By means of such a design of the collar region 14, sufficient axially movable support (engagement) for the shaft body 12 within the opening 11 of the intermediate piece 4 is ensured, on the one hand, and, at the same time, virtually negligible expansion of the drive train in 110 the axial direction is required.

The shaft body 12 has, in the surface thereof, a contour similar to a gearwheel or of the spline type, wherein the rising and falling flanks of the teeth run in a straight line and parallel to the axis of rotation R. There is a geometry corresponding thereto or corresponding thereto at least in some regions in the interior of the circumferential surface of the collar region 14 and hence within the opening 11. The surface within the opening 11 and the surface of the region of the shaft body 12 which extends into said opening 11 are of corresponding design in such a way that the transmission of a torque from the intermediate piece 4 to the shaft body 12 is made possible and, at the same time, axial displacement of the shaft body 12 relative to the intermediate piece 4 is made possible. The torque transmitted to the shaft body 12 is transmitted onwards by the latter to a transmission means 17, 17' fastened thereto. Different groups of fastening means 3, 3', 16, 16', 17, 17', 18, 18', 19, 19' are described below. The respective fastening means with the same number are provided for fastening two identical elements. However, it is also possible for fastening to include just one fastening means or more than the two fastening means illustrated in the figures. The fastening means 3, 16, 17, 18, 19 are each preferably fastened releasably. The numbering is chosen so that fastening means 3, 3' perform the fastening of the flywheel to the crankshaft; fastening means 16, 16' perform the fastening of the flywheel to the intermediate piece 4; fastening means 17, 17' perform the fastening of the shaft body 12 to the transmission element 13; fastening means 18, 18' perform the fastening of the transmission means 13 to the coupling device 1, and fastening means 19, 19' perform the fastening of a converter housing region 20 to the housing means 8 that may be present and to the flywheel housing 6.

In the embodiment illustrated, the rotor 7 is configured as a toothed rim ring, which is press-fitted on a supporting region 21 of the flywheel 2. The supporting region 21 has a stop 22, with which the end of the rotor 7 comes into contact. By virtue of the fact that the outside diameter of the disc-type intermediate piece 4 is at least slightly greater than the inside diameter of the annular-disc-type rotor 7, there can be contact and hence positive connection of the intermediate piece 4 to the rotor 7 at the opposite end of the rotor 7. It is thereby possible to prevent movement of the rotor 7 in the axial direction. Positive and/or nonpositive engagement for safeguarding against twisting can also be ensured in the connection of the rotor 7 on the supporting region 21 of the flywheel 2, e.g. by means of nonpositive engagement during the press-fitting operation described above. In addition or as an alternative to the embodiment illustrated, it is also possible for the rotor 7 to be placed on a supporting region (not shown) of the intermediate piece 4. As an alternative, it is, in turn, possible of course for the rotor 7 to be designed in such a way that it simultaneously has a supporting region 22 both on the flywheel 2 and on the intermediate piece 4.

Apart from the embodiments described in the preceding paragraph, provision can also be made for the intermediate piece 4 not to be connected directly to the flywheel 2, with the result that there is no direct contact between the intermediate piece 4 and the flywheel 2. Instead, the intermediate piece 4 is in contact with the rotor 7, and the rotor 7, in turn, is in contact with the flywheel 2. The intermediate piece 4 is thus connected indirectly to the flywheel 2 via the rotor 7 in a manner secure against twisting.

In another advantageous embodiment, provision may additionally be made for the fastening means 16, 16' to reach through the rotor 7, e.g. by means of a feed-through opening, and finally to fix the rotor 7 between the intermediate piece 4 and the flywheel 2 by means of a clamping action.

As an alternative or in addition, there can be a positive and/or nonpositive connection to the flywheel 2 and/or to the intermediate piece 4 at the end 23, 23" of the rotor 7.

As can be seen, in particular, from FIG. 1 of the drawing, at the end of the shaft body 12 remote from the crankshaft in the fully assembled state, the shaft body 12 has a bearing region 24 for accommodating and supporting a journal or a shaft region 25 of the coupling device 1, wherein the journal 25 or shaft region 25 of the coupling device 1 is rotatably mounted in the bearing region 24 of the shaft body 12 and is therefore supported against radial movements/forces. In a particularly preferred embodiment, a ball bearing unit can be arranged in the bearing region 24 of the shaft body 12, ensuring low-friction mounting of the journal 25 and simultaneous support of the journal 25 on the bearing region 24 and hence on the shaft body 12. As an alternative, the journal 25 can also be arranged on the shaft body 12 and the bearing region 24 can be arranged on the coupling device 1.

In order to allow as advantageous as possible assembly of the drive train according to the invention, provision is made for the shaft body 12, together with the coupling device 1 and the flexible transmission means 13, to form a first preassembled subassembly 26, which can be mounted as a unit on the second preassembled subassembly (flywheel subassembly 27) and/or brought together therewith in a linear movement and hence brought into at least torque-transmitting engagement. The flywheel subassembly 27 comprises at least the flywheel 2, the rotor 7 and the intermediate piece 4. Moreover, the subassemblies 26, 27 are each provided with the fastening means 3, 3', 16, 16', 17, 17', 18, 18', 19, 19' and thereof.

Fastening elements 17, 17' for connection to the shaft body 12 are provided in the radially inner region of the transmission means 13, and fastening elements 18, 18' for connection to an element of the coupling device 1 are arranged on the radially outer region of the transmission means 13. In the fully assembled state, the radially outer fastening elements 18, 18' are arranged at a spacing 28 from the axis of rotation R of the drive train which corresponds to 0.6 to 1.6 times the spacing 29 of the centre line 30 of the starter generator 5 from the axis of rotation R of the drive train. The centre line 30 of the starter generator 5 is defined as the average of the maximum and minimum spacing or radius of the starter generator 5 with respect to the axis of rotation. The structural components comprising the stator 9 and the rotor 7 of the starter generator 5 must be taken into account here. In other words, the fastening means 18, 18' is situated approximately at the level of the annular stator/rotor subassembly of the starter generator 5. Fastening means 18, 18' are preferably designed as screws, with the screw shanks thereof being aligned so as to face away from the starter generator 5.

The intermediate piece 4 has a feed-through opening 31, which is arranged and designed in such a way that, in the assembled state of the flywheel 2 and the intermediate piece 4, at least one fastening means 3, 3' can be fed through said feed-through aperture 31 and can reach its installation location. In addition or as an alternative, the feed-through opening 31 can be designed and arranged in such a way that at least one tool can be fed through the feed-through opening 31 and brought into engagement with at least one fastening means 3, 3', thus making it possible to act upon the fastening means 3, 3' through the feed-through opening 31 in the assembled state and hence in the fully assembled state of the flywheel 2 and the intermediate piece 4.

The flywheel 2 furthermore has a toothed rim 32, wherein the toothed rim 32 is arranged on that side of the flywheel 2 which faces towards the crankshaft. The toothed rim 32 is preferably in engagement with a gearwheel (not shown) which, in turn, can be driven by a further electric motor/generator (not shown). In addition to the imposition of torque on the flywheel by the crankshaft, it is thus furthermore possible to impose torques on the flywheel by means of the starter generator 5 and by means of the toothed rim 32 and the electric motor/generator (not shown) connected to the latter.

In the embodiment illustrated, fastening means 16, 16' is arranged in the vicinity of the supporting region 21. The supporting region 21 can thus serve as an abutment for fastening means 16, 16'.

The housing means 8 furthermore has a support region which is offset radially inwards towards the outer circumferential surface, which extends in a ring-like manner in the direction of the crankshaft and on which the stator 9 of the starter generator 5 is arranged. It is advantageous here that the ring-like support region of the housing means 8 projects into the inner region of the flywheel housing 6 of the flywheel 2 and/or is arranged at least partially within said housing (in the fully assembled state). The circumferential surface of the housing means 8 lies approximately at the level of that section of the flywheel housing 6 which surrounds the flywheel 2. The circumferential surface preferably ends approximately flush with that region of the flywheel housing 6 which surrounds the flywheel. The offset of the support region with respect to the circumferential surface allows at least partial assembly of the housing means 8 and the flywheel housing 6. A cooling duct can be arranged in the region of the housing means 8 and/or of the flywheel housing 6, wherein said cooling duct 34 is preferably formed integrally with the housing means 8 and/or the flywheel housing 6, at least in some regions, such that, at least in a partial region of the cooling duct, part of the cooling duct cross section is formed by a recess (not shown) in the housing means 8 and/or in the flywheel housing 6 and another part of the cooling duct cross section is formed by a covering element (not shown).

LIST OF REFERENCE SIGNS

L collar length
A spacing
1 coupling device
2 flywheel
3, 3' fastening means between 2 and crankshaft 4 intermediate piece.
5 starter generator
6 flywheel housing
7 rotor
8 housing means
9 stator
10 centre of 4
11 opening
12 shaft body
13 transmission means
14 collar region of 4
15 outer edge of 4
16, 16' fastening means between 2 and 4
17, 17' fastening means between 12 and 13
18, 18' fastening means between 13 and 1
19, 19' fastening means between 20, 8 and 6
20 coupling device housing
21 supporting region of 2
stop of 21
23, 23' end of 7
24 bearing region of 12
25 shaft region/journal of 1
26 first subassembly
27 flywheel subassembly
28 spacing between R and 18, 18'
29 spacing between R and 5
30 centre line of 30
31 feed-through opening
32 toothed rim

The invention claimed is:

1. An arrangement connectable to a crankshaft of an internal combustion engine, comprising:
   a flywheel connectable to the crankshaft;
   a coupling device connectable to output elements;
   an intermediate piece connected between the flywheel and the coupling device and configured to transmit torque between the flywheel and the coupling device, the intermediate piece having an opening disposed in a center thereof;
   a flywheel housing;
   a starter generator arranged within the flywheel housing and operatively connectable to the crankshaft;
   a shaft body axially movably mounted in the opening of the intermediate piece; and
   a flexible transmission element, the shaft body connected to the coupling device by the flexible transmission element.

2. The arrangement according to claim 1, wherein the shaft body is connected positively to the opening of the intermediate piece such that a torque can be transmitted from the intermediate piece, via the shaft body, to the flexible transmission element fastened to the shaft body.

3. The arrangement according to claim 1, wherein at least one of:
   the intermediate piece is fastened detachably to the flywheel;
   the shaft body is fastened detachably to the flexible transmission means; and
   the flexible transmission element is fastened detachably to the coupling device.

4. The arrangement according to claim 1, wherein the shaft body comprises a bearing region at an end of the shaft body remote from the crankshaft in the fully assembled state of the arrangement, the bearing region configured to accommodate and support at least one of an output shaft and shaft regions of the coupling device, wherein the at least one of the output shaft and the shaft regions of the coupling device are rotatably mounted in a bearing region of the shaft body and therefore radially supported.

5. The arrangement according to claim 1, wherein the shaft body, the coupling device, and the flexible transmission element together form a first preassembled subassembly that is mountable as a unit on a preassembled flywheel subassembly including the flywheel and the intermediate piece.

6. The arrangement according to claim 1, wherein the intermediate piece includes at least one feed-through opening arranged and designed such that, in the assembled state of the flywheel and the intermediate piece, at least one fastening means for fastening the flywheel to the crankshaft can be released and/or fixed by feeding one of a tool and the fastening means itself through the feed-through opening, and wherein the centre line of the feed-through opening is one of coaxial and axially parallel and has a maximum axis offset of 3 cm with respect to one of the centre line of a fastening means feed-through bore of the flywheel and a centre line of a fastening means receptacle on the crankshaft.

7. The arrangement according to claim 1, further comprising a toothed rim arranged on an outer circumference of the flywheel, wherein the toothed rim is connected to a further electric motor/generator by at least one gearwheel.

8. The arrangement according to claim 1, wherein the intermediate piece is disc-shaped and, in the region of the opening, comprises a collar region, wherein the collar region preferably extends towards the crankshaft in the fully assembled state of the intermediate piece, and a ratio of the collar length L to the spacing A of the axis of rotation R from an outer edge of the intermediate piece is at least 1:1.0 to 1:5.0.

9. The arrangement according to claim 8, wherein the ratio is 1:1.5 to 1:3.0.

10. The arrangement according to claim 1, wherein the flexible transmission means is one of disc-shaped, prism-shaped, and cylinder-shaped,
   wherein fastening elements for connection to the shaft body are arranged in a radially inner region of the flexible transmission element, and radially outer fastening elements for connection to a coupling device element are arranged on a radially outer region of the transmission means, and, in the fully assembled state of the arrangement, the radially outer fastening elements are preferably at a spacing from an axis of rotation R of the drive train which corresponds to 0.6 to 1.6 limes the spacing of the centre line of the starter generator from the axis of rotation R of the drive train.

11. The arrangement according to claim 10, wherein the spacing of the radially outer fastening element from the axis of rotation is 0.85 to 1.35 times the spacing of the centre line of the starter generator from the axis of rotation R of the drive train.

12. The arrangement according to claim 1, wherein the starter generator comprises a stator and a rotor, and at least one of:
   the stator is fastened at least in some regions to one of the flywheel housing and a housing that fits over the coupling device, and
   in the region of the starter generator, a cooling device for dissipating waste heat from the starter generator is arranged in or on the one of the flywheel housing and the housing which fits over the coupling device.

13. The arrangement according to claim 12, wherein the rotor fastened at least in some regions to at least one of the flywheel and the intermediate piece.

14. The arrangement according to claim 12, the rotor is prevented from axial displacement by adjacent regions of the flywheel and of the intermediate piece.

15. The arrangement according to claim 12, the rotor is positively restricted, at least in its axial mobility, by adjacent regions of the flywheel and of the intermediate piece.

16. The arrangement according to claim 15, wherein, in the fully assembled state of the arrangement, the rotor is connected with at least one of the flywheel and the intermediate piece such that the rotor is secured against twisting.

17. The arrangement according to claim 16, wherein the rotor is one of disc-shaped, prism-shaped and cylinder-shaped.

18. A method for assembling a drivetrain arrangement for an internal combustion engine with a crankshaft, the drivetrain arrangement having a flywheel connectable to the crankshaft, a coupling device connectable to output elements, an intermediate piece arranged in a torque-transmitting manner between the flywheel and the coupling device, the intermediate piece having an opening in a radially inner region thereof, and a starter generator arranged within a flywheel housing and operatively connectable to the crankshaft, the method comprising:
 preparing a first subassembly consisting of a shaft body connected to the coupling device by a flexible transmission element,
 preparing a second subassembly consisting of the intermediate piece mounted on the flywheel,
 joining together the two subassemblies such that the shaft body projects at least in some regions into the opening of the intermediate piece, the shaft body being mounted such that the shaft body can be moved longitudinally and is secure against twisting relative to the intermediate piece, at least a fully assembled state of the shaft body.

19. The method according to claim 18, further comprising at least one of:
 mounting fastening means for fixing the flexible transmission means on the coupling device before preparing the first subassembly, and
 mounting fastening means for fastening the flywheel to the crankshaft before preparing the second subassembly.

\* \* \* \* \*